United States Patent [19]
Gan

[11] Patent Number: 5,194,891
[45] Date of Patent: Mar. 16, 1993

[54] COLOR IMAGE PRODUCTION CONTROL

[76] Inventor: Chiu L. Gan, Blk 220, Jurong East St 21, Unit 16-623, Singapore 2260, Singapore

[21] Appl. No.: 713,712

[22] Filed: Jun. 11, 1991

[30] Foreign Application Priority Data

Jun. 12, 1990 [GB] United Kingdom ................ 9013087

[51] Int. Cl.$^5$ .............................................. G03B 27/80
[52] U.S. Cl. ......................................... 355/38; 355/77
[58] Field of Search ................... 355/32, 35, 38, 68, 355/77, 326, 327; 356/444

[56] References Cited

U.S. PATENT DOCUMENTS

| | | | |
|---|---|---|---|
| 3,572,943 | 3/1971 | Corley | 356/404 |
| 4,448,521 | 5/1984 | Shiota | 355/77 |
| 4,464,045 | 8/1984 | Findeis et al. | 355/38 |
| 4,577,961 | 3/1986 | Terashita | 355/77 |
| 4,650,316 | 3/1987 | Matsumoto | 355/55 |
| 4,660,965 | 4/1987 | Matsumoto | 355/41 |

FOREIGN PATENT DOCUMENTS 2046943 11/1980 United Kingdom .
1587322 4/1981 United Kingdom .
2172714 6/1988 United Kingdom .

Primary Examiner—Michael L. Gellner
Assistant Examiner—D. Rutledge
Attorney, Agent, or Firm—Baker & Daniels

[57] ABSTRACT

This invention relates to the process of producing an inherently color biased image composition. More specifically, the invention is concerned with identifying the inherent color bias characteristics of an image, so that the image density variation from the image production system targeted density can be compensated by including a complementary color zone to be included in the computation by an image analyzer, thereby automatically achieving optimum color balance in the projected image. Another aspect of the invention relates to the process of producing color images using color panel(s), being concerned with a method of visual identification of an absence or an additional presence of a hue that tilt the color balance on a hue sensitive color panel. These methods are apt for color photographic prints control as well as for any color image production systems working on similar color production principles.

15 Claims, 4 Drawing Sheets

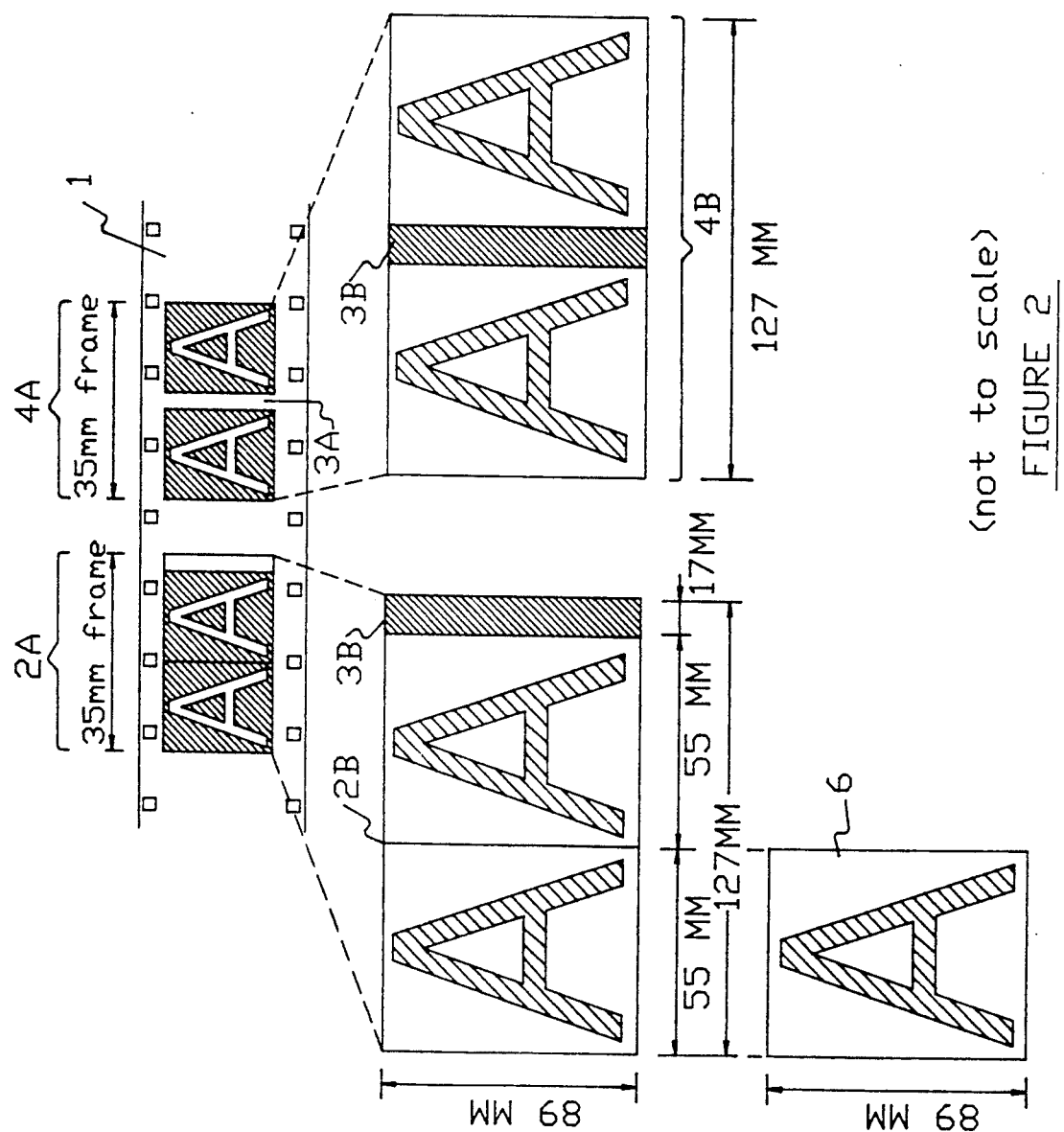

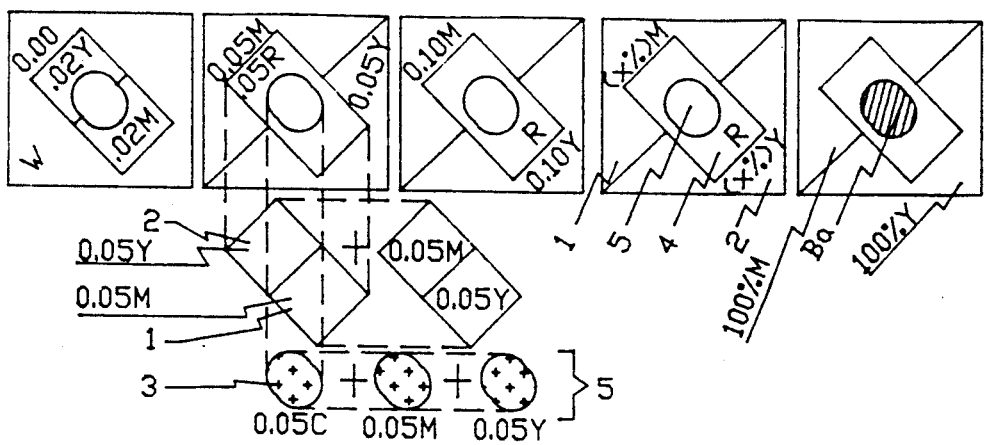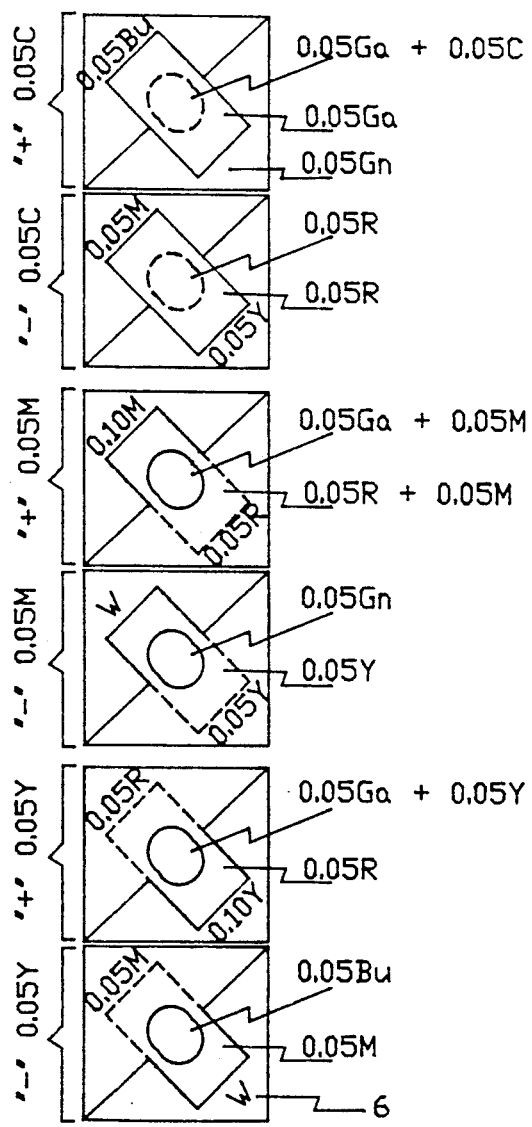
FIGURE 3

COLOR IMAGE PRODUCTION CONTROL

In a photographic printing system, it is necessary to photographically measure density of an original film (e.g. a negative film) in order to determine the exposure amount of correction amount in photographic printing. Existing methods of machine analyzer exposure determination include the LATD (large area transmittance density) method, and also other method of which the printing system reads off from a negative film that is segmented into a large number of arrayed pixels for detecting image information. Either of the methods would result with a print that has a density being predetermined by a formula after correlating to the image information. This is based on the empirical rule that the average reflectivity or transmittance of three colours obtained by integration of the whole scene, when an ordinary scene is photographed, is substantially constant.

On the other hand, if a density image on a film is highly biased, the average transmittance due to the integration of the whole scene substantially varies from the empirical constant. Then the printing systems would tend to compensate exposure resulting with a print that is incorrectly exposed. In such instance, the operator would have to manually key in the filtration amount in order to correct the colour deficiency in the print. It is not always easy to identify the cause of a evident colour cast. For example, a yellow cast may have been brought about not only through excessive gain in the yellow but also through too low values in the cyan or the magenta. Hence problem arises due to the operators' difficulties in identifying the hue correction required of a particular colour cast, consequence with many trial and error attempts. Therefore attempts to print from inherently bias colour negative inevitably lead to the ineffective use of the printing system, resulting with increased machine down-time.

The difficulties of printing from bias colour negatives also explains the typical 1-hour photo-lab outlets, or fast photo-print finishers, reluctance to include in their product line the printing of photographic name cards and advertising prints. Most 1-hour automatic printing systems can perform 55 mm × 89 mm size prints, a typical name card dimensions, by having additional machine accessories. But the printing from inherently bias density colour negatives, being derived from the typically colour bias graphic layout of name cards and advertisement prints, would cause a printing system down time. Therefore, even though the printing of photo-name cards has a much higer margin of profit relative to the printing of the amateur photographers' photoprints, this market has traditionally been the domain of few entrepreneurs using costly custom-built photo-print system. These latter printing systems, which entail substantial manual colour keys manipulation, are designed especially for printing typical photo-name card of 55 mm × 89 mm dimensions.

FIG. 1 shows how a balancing zone 11 with a density bias that complements the inherent bias of the desired image 10. A prior art base on the United Kingdom patent application GB 2046943-A requires a purposely built device into the photographic printing system to identify the colour panel present on a colour film so as to automatically effect a machine processor colour adjustment according to the made of film. The said balancing zone is distinct from prior art in that the it utilise the existing system of colour analyzer by working in tandem to a pre-determined formulae of exposure base on certain empirical value. Additionally, while the prior art has a colour panel that is outside of the film image analyzing area, this invention would require the said balancing zone to be within the image analyzing area as in FIG. 1(a), at least initially. An additional distinction is that the characteristic of the invented colour zone is dependent on both the film characteristics as well as the image characteristic, whereas prior art has a colour panel that is independent of the image characteristic. This distinction is very important because the prior art does not solve the exposure compensation problem encounter when making photographic print from high colour bias image on the film.

FIG. 2 is a simple illustration of obtaining a "2R" size print 6 being trimmed from "3R" print 2B via a negative 2A having dual images incorporated into a 35 mm frame colour negative. A method for PHOTOGRAPHIC PRODUCTION OF BUSINESS AND NAME CARDS is described in a United Kingdom Patent GB-2172714-B. This prior art requires a copied image on the emulsion film to be processed in a manner that produce a high contrast. The same problem of operator's difficulties in achieving optimum colour balance print derived from an inherently biased negative film image still remains. An important distinction between the said prior art and this aspect of the invention is the inclusion of a balancing zone 3A and zone 3B that is complementary to the bias colour image. With the inclusion of this said zone, an inherently colour bias film image can advantageously be produced with relative ease through reliance on a photographic printing system's automatic detect and print features; thus little manual intervention by the operator is needed.

FIG. 3 illustrate use of colour panel/s for colour assessment. A United Kingdom Patent Application GB 2046943-A has make use of at least one colour panel on a colour film to effect a printing system automatic colour exposure correction due to the different inherent colour bias film by different film manufactures. The invented colour panel described herewith is distinctly different from the said prior art in that (i) prior art serve to identify colour bias attributed only to the make of film by different manufacturers; whereas this said invented colour panel here identify an inherent colour bias attributed to both the made of film and the colour image within.

(ii) prior art identify a film bias by relying on the machine processor to compare the measured spectral transmissivity of the colour panel on the emulsion film to that of known standard values corresponding to known different film types; whereas this said invented colour panel identify a bias primarily by null field comparison test via the basic colour changes being effected by an additional presence or absence of a hue.

It is an object of the present invention to overcome the twin problems of a image producing system tendency to compensate the exposure of an inherently biased image during the process of light projection, and also resolving an operator's difficulties in identifying the hue correction needed of an incorrectly colour balance projected image.

According to one aspect of the present invention there is provided a method of projecting an inherently colour bias image, in which the bias image density is processed together with a balancing zone having a bias that is generally complementary to the bias image, so that a correct exposure for projecting the biased image is determined on the basis of computed integration over both the biased image and the balancing zone.

According to a second aspect of the invention there is provided a method of exposure colour printing through a colour emulsion film by means of a photographic printing system having an automatic metering system of determining the film exposure and the colour settings at a predetermine formulae, comprising the steps of a) having a *balancing zone* associated adjacent to an image, both being placed within an area addressed by the machine analyzer when making the respective determination, whereby the analyzer reads an appropriately balanced colour composition in spite of any colour bias in the image, and b) after the exposure settings has been automatically determined, control means for locking the exposure and filtration is activated by coupling the exposure control unit with an electrical switch, whereby a physical displacement of the balancing zone film portion by another portion of useful film image can be done.

According to a third aspect of the invention, there is provided a method of producing name cards, graphic prints and bias density image prints; in which the artwork, comprising pictures, symbols, logos, numerical and/or alphabetic characters, in any desired colours and in any desired arrangement; is copied together with a balancing zone of density and colour that complements the desired image density, as a single assembly; in at least one exposure onto a colour emulsion film; the exposed colour film is normally processed; the processed colour film is printed onto colour photographic paper; and the latter is cut to size thus providing the desired number of prints in colour.

Another aspect of the invention, wherein a balancing zone; being define as an overall colour cast superimposed on the image, or a distinctly separate colour area from the image, or a colour integration equivalent of more than one colour area, or a logarithm equivalent, or any form of communicating a colour density identification; serves a primary purpose of causing an image analyzer to include in its computation a desired complementary density variation.

According to another important aspect of the invention there is provided a method of detecting the colour balance of an image via producing the image together with at least one colour panel, which is make up of at least one primary colour and that one part of this panel area being combined with another primary colour forming a different basic colour panel, arranged such that any additional presence or an absence of a hue can be shown very sensitively by the resulting basic colour changed on the panel/s, thus permitting rapid adjustment during the colour image production process.

According to another aspect of the invention there is provided a method of displaying more than one colour panel, each panel being distinct by its colour saturation, thus forming a step-tablet of increasing saturation panels, effectively serving as a visual calibrating tool for an image colour and density assessment.

According to another aspect of the present invention there is provided a method of producing a colour image using a machine with variable primary colour settings, wherein an image is created alongside at least one density selected colour panel, panel having at least one primary colour, and that one part of the panel being combined with another primary colour forming another different basic colour, the resulting basic colour changed of the or each panel due to the colour characteristics of the image produced is detected and analysed, the correct colour patch which distinct from the preferred host panel will be a desired image production.

The present invention will now be describe, by way of example, with reference to the accompanying drawings, in which FIG. 1 diagrams show how a complementary balancing zone is utilised on a colour negative and the subsequent locking of the exposure settings.

FIG. 2 diagrams show a method of "3R" size print being composed of "2-UPS" images and also a balancing zone being included on a 35 mm colour negative.

FIG. 3 diagram shows an example of the colour panel/s display design for detecting additional presence or an absence of a hue in a colour image.

The ensuing description specifically relates to the use of the balancing zone invention in connection with a colour negative film being process by typical 1-hour photo-lab outlets, though the invention also applies generally to photographic films having blue-, green-, and red-sensitive layers as well as image production system having the three primary colour as its primary elements. The primary colour refers to either or both the subtractive and the additive colour principle of colour production. The colour panel aspect of the invention is generally suitable for use with any image producing system that rely on the human eyes as the densitometer for null comparison test in assessing the quality of the colour image. This would include colour television images and also off-set colour printed images.

DETAILED DESCRIPTION OF THE PREFERRED EMBODIMENTS

Figure 1:
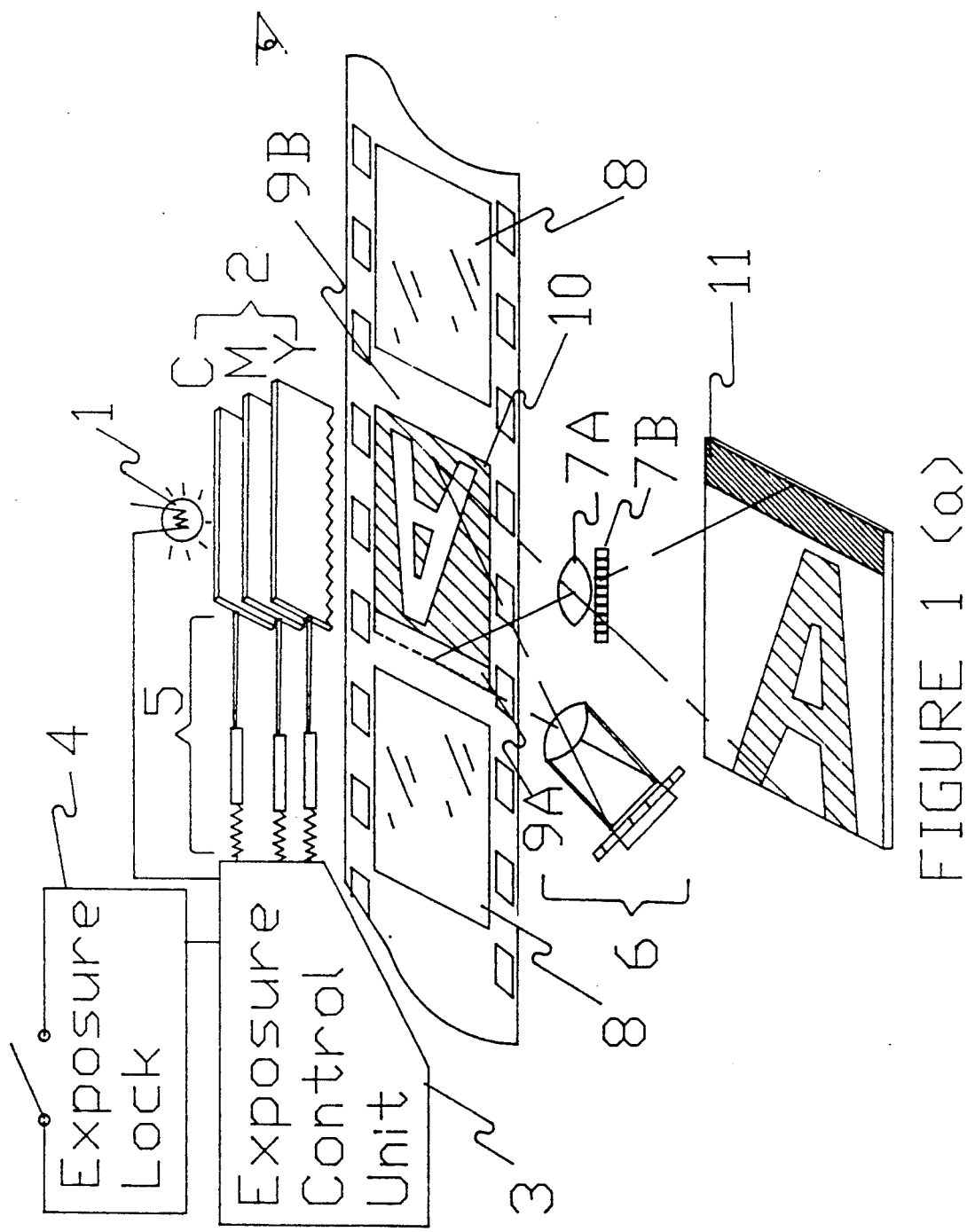

FIG. 1 shows a device embodying this invention method wherein an image information detecting apparatus 6 being linked to the exposure control unit 3 which processes the detected image signals therefrom. First, a negative film 9(A) and negative film 10 is mounted at the printing section. Negative film 9(A) or 9(B) is an unexposed but already processed part of the negative, located between two adjacent frames of images, being selected as a complementary balancing zone. The printing section is illuminated with light from a light source 1 via colour compensation means 2 of three complementary colours of yellow (Y), magenta (M), and cyan (C), and the light transmitted through the negative film 9A and negative 10 is directed to a photographic sheet of paper 11 via a lens unit 7(A) and a black shutter 7(B). The subtractive filters 2 can be inserted into the path of the printing light by means of respective magnets 5 which are controlled by current supplied from a conventional exposure control unit 3, for example of the kind described in United Kingdom Patent GB No. 2046943A. After the exposure has been automatically determined, a projection onto the paper 11 would include a saturated black zone on the paper and a portion of the desired image being "trimmed" from sight. This composite image is undesirable hence this projection exposure should not be printed but its useful exposure settings should be retained.

Figure 1B:
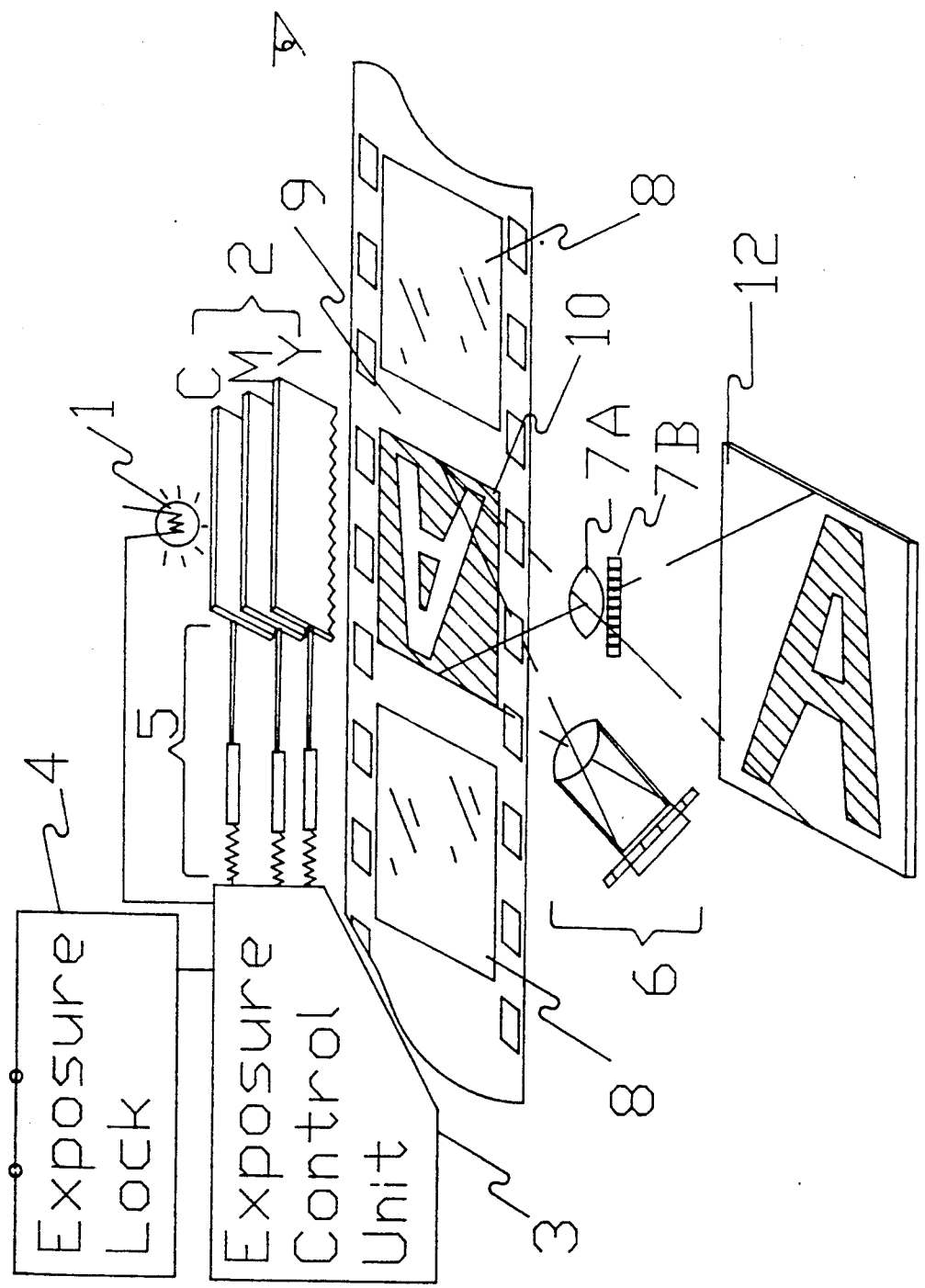

The FIG. 1(b) shows the same device as in FIG. 1(a) but with the subsequent step of activating an exposure lock 4 which has been coupled to the exposure control unit 3, followed by the physical displacement of negative 9A by a complete image of negative 10. The negative 10 is then exposed onto the paper with the retained colour exposure settings producing a colour balance image on print.

FIG. 2 shows the method for producing photographic name cards from a 35 mm colour negative film 1, print exposure being derived from a composite images of the "2-UPs" picture and a balancing zone 3A on a single 35 mm frame of negative 2A or as in negative frame 4A corresponding to the photographic paper print 2B and print 4B respectively. A typical name card print size 6 is cut from paper print 2B. The "2-UPs" dual images is obtained by making double exposure of a single finished artwork "A" placed against a black velvet cloth background. The black velvet cloth is necessary to obtain a colourless or unexposed balancing zone on the negative.

The said balancing zone can be substituted in various manner with substantially similar result when combined with an inherently biased image. For example, the balancing zone can be an area of colour selection that compliments and thus form part of the overall graphic design.

if an image has a heavy red cast over its entire image, the balancing zone on the print could have a combination of saturated black colour zone and a saturated cuan zone.

if an image is preferred to have a light colour cast or substantiate light background, generally, a saturated black zone on the print would achieve a good result print.

in addition, a colour zone can in effect be a colour cast superimpose over the entire image with substantially the same result.

The amount of colour cast can also be converted into the printing system exposure control unit as a programme in logarihm form.

Essentially, the said balancing zone exist in any useful form for communicating a presence of another bias hue value so that its integrated density value when being combined with a desired image of biased density value, computed by an image analyzer, would produce an exposure of the desired characteristics.

FIG. 3 diagram shows the step-tablet form of displaying a series of colour panels. In this example, the colour panel is make up of one primary colour Magenta 1, and that one part of the panel has another primary colour Yellow 2, the resulting combination of hue panel 1 and hue panel 2 forming a visual Red hue panel 4. Magenta and yellow hues were selected as the host panels because it is common practice in photographic printing to make colour correction on a print with these two main colour keys, that is, magenta and/or yellow only. Also within the hue panel 4 which is a composite of two primary colours, a third primary colour (cyan) panel 3 is added to form a light gray panel 5. Density of each panel range from 0% onward with gradual marginal increment of the hue saturation in each panel. The colour arrangement is designed so that an additional presence or an absence of a hue at different density level can be shown very sensitively by the resulting basic colour changed on the panel/s, thus permitting rapid adjustment during the colour image production process. Ease of use of this visual calibration tablet relies mainly on the null field comparison test attributed to each hue visual effect on the colour panel/s. For example, referring to the "−" 0.05 Y panel, if the print has an absence of yellow by a 5% saturation value, the 0.05 panel (that is 5% saturation colour panel display) would have its original yellow appeared as white panel 6, and the original red panel 4 outline becomes non-distinct while one half of the original panel 4 has the same colour and density field as its comparison field (the host panel 1); and the gray panel 5 would show a blue patch once its yellow element is removed. In addition, the other panels of higher saturation density would not have much "easy identification" visual changes, though the 0.10 saturation panel may show some effect but is not as distinctive as in 0.05 saturation panel.

A preferred method for producing these display colour panels is by off-set printing. Due to the overlapping of hue at the smaller panels, therefore, panel 5 has a higher density saturation than panel 4, panel 2, or panel 1; while panel 4 would also be of higher density saturation than panel 1 or panel 2. The panel/s can be effected onto the negative during the exposure made of the image while using the camera. One example is by placing a finished artwork adjacent to the said off-set printed colour panel/s and then copied both as a single assembly onto the film in the camera. Another example is to place an appropriate filter/s diffuser within the camera device such that it is advantageously positioned directly in front of the emulsion film, whereby an exposure made of an object would simultaneously capture a colour identification panel, derived from the selected filter diffuser, on every frame of the film.

Human eyes are good visual tools for null comparison tests. Hence the said step-tablet colour panels when projected as a visual image would facilitate colour identification. The colour selected shall be changed appropriately to the colour production system, example, if its television images, then the additive primary colours are emphasis in the main colour panels display. The colour panel/s if incorporated into a colour film, then a densitometer device for such identification could be built into a image reading system to take advantage of this colour panel design.

It should be understood that many modifications and adaptations of the invention will become apparent to those skilled in the art and it is intended to encompass such obvious modifications and changes in the scope of the claims appended hereto.

I claim:

1. A method of exposure color printing including the steps of exposing a color emulsion film with an image and printing the image by means of a printing machine having an automatic metering system for determining color settings, the method including the following step previous the step of printing the image:

providing a balancing zone adjacent the image on the film, the balancing zone having a bias generally complementary to a bias of the image of the film, so that a correct exposure for printing the biased image of the film is determined by the automatic metering system on the basis of measurements integrated over both the biased image of the film and the balancing zone.

2. A method according to claim 1, in which the balancing zone comprises a uniform colorless field of an area and density complementary to a bias in the density of the exposed image.

3. A method according to claim 1, in which the balancing zone comprises a uniform field of a hue complementary to a dominant hue in the biased image.

4. A method according to claim 1, in which the balancing zone is exposed on the emulsion film at the same time as the biased image.

5. A method according to claim 1, in which the balancing zone is formed by attaching a film of appropriate area and color to the exposed emulsion film carrying the biased image.

6. A method according to claim 1, in which in the balancing zone is provided in a region outside the normally printable area of the film, and in the step of printing the film the film is offset from its normal printing position with the respect to the analyzer so that the analyzer views both part of the biased image and the balancing zone, the printing machine is locked at the exposure thereby determined, and the film is moved back to its normal printing position for printing of the image.

7. A method according to claim 1, in which the automatic metering system includes an LATD analyzer.

8. A method of producing graphic prints and color bias image prints, the method including the steps of:
- photographically recording a finished artwork or object together with a balancing zone as a single assembly;
- exposing at least one print onto a frame of color emulsion film;
- processing the exposed color film;
- printing the processed color film onto color photographic paper; and
- cutting the photographer paper to size thus providing a desired number of prints in color.

9. A method according to claim 1 including the steps of photocomposing and printing the image on a business card.

10. A method of detecting the color balance of an image comprising the steps of:
- forming the image together with at least one color panel, which is made up of at least one primary color;
- incorporating one part of the panel area with a visually identifiable marking panel marginally different in density to that of an original panel area;
- arranging the image and the panel such that a change in density or an additional presence or an absence of a color can very sensitively be shown by a null field comparison effect.

11. A method as in claim 10, further comprising the steps of:
- combining one part of the panel area with another primary color forming a different basic color panel; and
- arranging the different panel such that any additional presence or an absence of a hue can very sensitively be shown by the resulting basic color change on the panel(s), thus permitting rapid adjustment during the color image production process.

12. A method as in claim 11, further including the step of displaying more than one color panel, each panel being distinct by its color saturation, thus forming a step-tablet, effectively serving as an image color and density calibrating tool.

13. A method of producing a color image using a machine with variable primary color settings, the method comprising the steps of:
- creating an image alongside at least one density selected color panel, the panel having at least one primary color;
- combining one part of the panel with another primary color forming another different basic color;
- detecting and analyzing the resulting basic color change of each panel part of the panel due to the color characteristics of the image produced, the correct color panel part which is distinct from a preferred host panel will be a desired print.

14. A method of producing a color image using a machine with variable primary color settings, wherein a biased image is created alongside hue step tablet areas of gradual, varying intensities of the three primary colors, incorporating in each area visually identifiable markings of marginally different intensity to that of the rest of the respective area, and the color settings of the machine are adjusted in accordance with the results of a null comparison test using the step tablet.

15. A method according to claim 8 including the steps of photocomposing and printing the image on a business card.

* * * * *